United States Patent

[11] 3,597,529

[72] Inventor Terry J. Hickman
North Syracuse, N.Y.
[21] Appl. No. 764,735
[22] Filed Oct. 3, 1968
[45] Patented Aug. 3, 1971
[73] Assignee General Electric Company

[54] SYSTEM FOR THE CORRECTION OF DIFFERENTIAL PHASE DISTORTION IN A COLOR TELEVISION SIGNAL
5 Claims, 1 Drawing Fig.

[52] U.S. Cl. 178/5.4
[51] Int. Cl. H04n 9/02
[50] Field of Search 178/5.2, 5.4

*Primary Examiner*—Richard Murray
*Attorneys*—Thomas A. Briody, W. Joseph Shanley, Frank L. Neuhauser, Oscar B. Waddell and Marvin Snyder

ABSTRACT: A system for the correction of differential phase distortion in a color television signal in which an active filter is used to process the chroma components of a clipped portion of the video signal to generate a correction signal. The correction signal is added to the main video signal in quadrature to change differential phase with minimal change of frequency response and differential gain. The polarity and amount of correction can be varied.

PATENTED AUG 3 1971 3,597,529
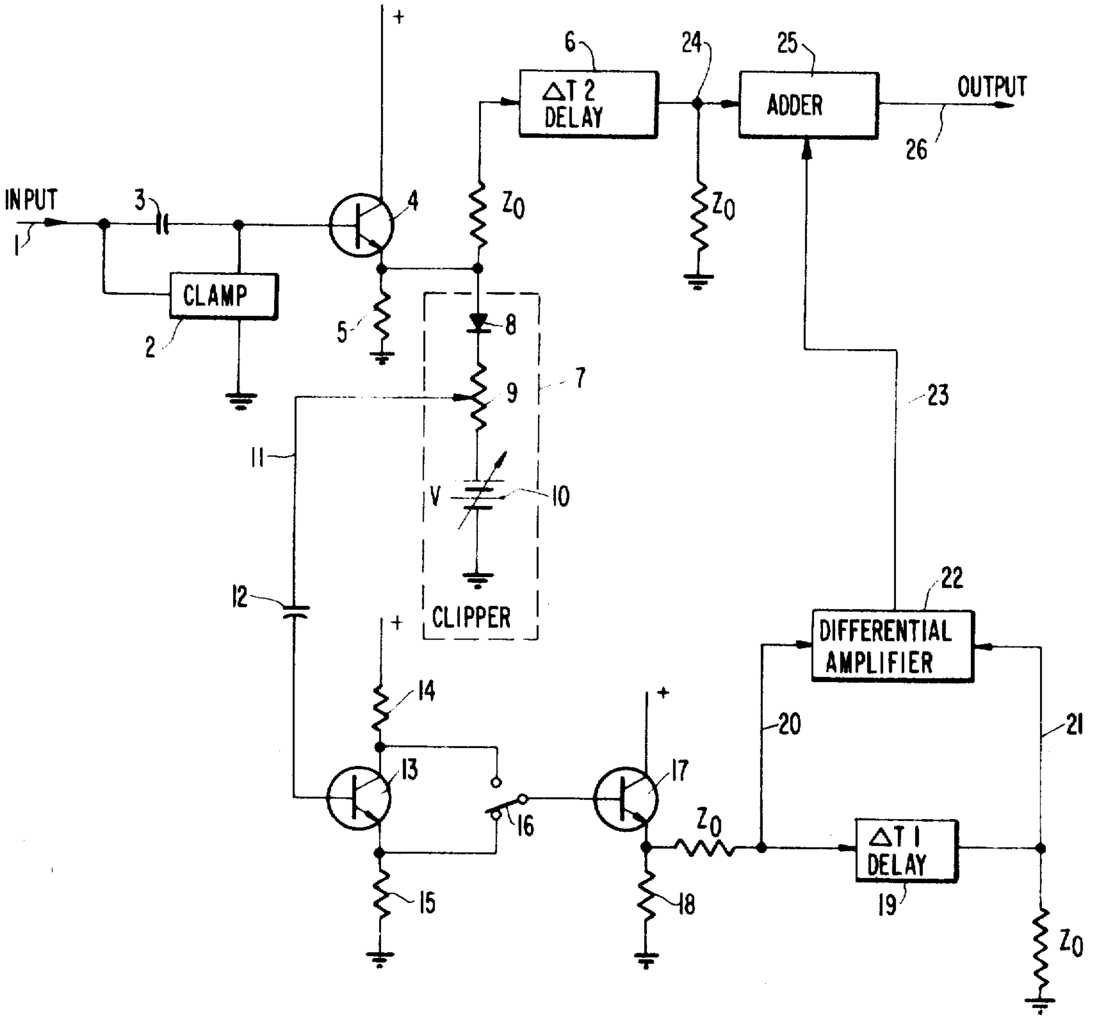
INVENTOR
TERRY J. HICKMAN
BY Thomas A. Briody
ATTORNEY

SYSTEM FOR THE CORRECTION OF DIFFERENTIAL PHASE DISTORTION IN A COLOR TELEVISION SIGNAL

BACKGROUND OF THE INVENTION

1. Field of the Invention

This invention relates to circuits for correcting for the distortion of a signal and more particularly to a system for correcting differential phase distortion in color television signals.

2. Description of the Prior Art

U.S. Pat. No. 3,315,170 (Baker) discloses a system for providing phase correction of a color television signal. The Baker system employs time delay circuits which are not capable of providing a relatively constant phase shift between an input signal and a correction signal.

SUMMARY OF THE INVENTION

Differential phase distortion in a color television signal is defined as a phase shift of chroma frequencies in the form of a modulated subcarrier frequency, which phase shift is dependent upon the luminance portion of the signal. This distortion results in a hue change as the brightness level of the picture changes.

This invention comprises a system by which such distortion may be corrected. The correction system could also be placed in the signal path ahead of a distortion-producing system to predistort the signal so that the output of the entire system will be relatively distortion free with respect to differential phase errors.

The system provides the necessary phase shift over the portion of the video signal where such a shift is required, without introducing appreciable adverse errors in frequency response or differential gain distortion. The system can introduce phase lead or phase lag at any luminance amplitude required. A novel combination of delay lines and differential amplifiers provide a correction signal which is maintained in quadrature with the video signal to be corrected, thus providing a relatively constant phase shift not provided by Baker.

Briefly, in accordance with a preferred embodiment of the invention, a system by which differential phase distortion may be corrected comprises clipping means receiving a video signal incorporating chroma components, and first delay means coupled to the clipping means and responsive to signals of amplitude in excess of the level at which the clipping means is set for selectively imparting substantially a 180° phase delay to the clipped subcarrier frequency of the video signal. Comparison means responsive to output signals of the clipping means and the first delay means are provided for producing a correction signal dependent upon the phase difference between these output signals, and second delay means receiving the video signal are provided to add substantially a 90° phase delay to the subcarrier frequency of the video signal. Means responsive jointly to the comparison means and the second delay means are also provided for combining the output signals of the comparison means and the second delay means to produce an output subcarrier signal having minimum differential phase distortion.

BRIEF DESCRIPTION OF THE DRAWING

The FIGURE is a schematic circuit diagram of a device according to the present invention.

DESCRIPTION OF THE PREFERRED EMBODIMENT

The FIGURE illustrates a correction system according to the present invention. A video input signal incorporating both luminance and chroma components arrives at the input to the system on line 1. A clamp 2 operates to clamp the output of an input capacitor 3 to ground at the back porch level of the video signal. The clamp may be a switch operated by a delayed sync pulse and arrange to connect the output of capacitor 3 to ground for an instant during each back porch interval.

A transistor 4 and resistor 5 are connected to form an emitter follower amplifier. The clamped signal from the output of capacitor 3 is applied to the base of transistor 4 and appears as a video signal at a known DC voltage level across an emitter resistor 5.

The video signal from the emitter is applied to a delay line 6 and also to a clipper 7. Clipper 7 includes, in series combination, a diode 8, a potentiometer 9 and a source 10 of variable voltage V.

Differential phase distortion, as is well known in the art, is the change in phase of subcarrier frequency as a result of variations in luminance level of the video signal which commonly occur in television transmitters as a result of nonlinearities in active devices contained therein. By intentionally distorting phase of the video signal in a manner opposite to the phase distortion introduced by the transmitter, a signal of relatively low phase distortion results. At low luminance amplitudes, differential phase distortion is at negligibly low levels, and needs no compensation. At higher luminance amplitudes, however, differential phase distortion is sufficiently high as to require correction. Therefore, voltage V is made variable to select the video signal amplitude level above which phase correction is to take place. Diode 8 conducts only when emitter voltage on transistor 4 has risen above the level of voltage V. Potentiometer 9 controls the amount of correction being made by adjusting magnitude of the clipped signal applied to a potentiometer output line 11.

The signal on line 11 passes through an AC coupling capacitor 12 to the base of a phase inverter transistor 13. Transistor 13 is connected in series with a collector resistor 14 and an emitter resistor 15.

A switch 16 is provided to alternatively connect the base of a transistor 17 to the collector or to the emitter of transistor 13. When switch 16 is connected to the collector of transistor 13, the signal applied to the base of transistor 17 is an inverted version of the clipped signal from the clipper. When switch 16 is connected to the emitter of transistor 13, the signal applied to the base of transistor 17 is noninverted version of the clipped signal. The operation of switch 16 controls whether phase lead or phase lag correction takes place.

Transistor 17 and an emitter resistor 18 form an emitter follower amplifier used as a buffer between switch 16 and a delay line 19. Each of the delay lines 6 and 19 may be driven from and terminated in its respective characteristic impedance $Z_0$.

Delay line 19 imparts to the clipped signal from transistor 17 a phase delay or lag $\Delta T_1$. The delay line is designed so that $\Delta T_1$ is 180° at the subcarrier frequency used with the video signal. Lines 20 and 21 couple the input and output of delay line 19 to different inputs of a conventional differential amplifier 22 to provide on amplifier output line 23 a correction signal proportional to the difference between the input and output signals of delay line 19 which appear on lines 20 and 21, respectively.

Because the value chosen for $\Delta T_1$ is 180° at the subcarrier frequency, at DC and low frequencies the signals on lines 20 and 21 are effectively common mode signals which cancel in the differential amplifier 22, yielding a zero correction signal on line 23. However, at the subcarrier frequency, which is produced in the presence of chroma signals, the signals on lines 20 and 21 are applied to the differential amplifier in a differential mode, yielding a peak or maximum voltage correction signal. At twice subcarrier frequency the line phase shift imparted by delay line 19 is 360°, resulting in a common mode input to the differential amplifier, and a minimum correction signal. It can be seen that delay line 19 and differential amplifier 22 act as an active filter to provide a correction signal with amplitude peaks at the subcarrier frequency and at odd multiples of the subcarrier frequency and with nulls at even multiples of the subcarrier frequency.

Delay line 6 is chosen to have a delay $\Delta T_2$ sufficient to impart a delay of 90° to a signal at the color subcarrier frequency. Thus, the delay modulated subcarrier signal on line 24 at the output of delay line 6 and the correction signal on line 23 will have a phase difference of 90° at the subcarrier frequency. Furthermore, it can be shown that the phase difference between the signals on lines 23 and 24 will remain 90° for any frequency up to the point where the delay lines 6 and 19 no longer display linear phase shift.

Since the signal on line 24 is the main video signal subjected to a time delay and the signal on line 23 is derived from a clipped portion of the input signal, if the signals on lines 23 and 24 are added in correct proportion, the chroma portions of the video signal are shifted in phase with respect to those portions of the video signal which are not passed through the clipper. Operation of switch 16 to invert, or reverse the polarity of the clipped signal will cause a phase shift in the opposite direction, i.e., a phase advance.

The signals on lines 23 and 24 are added in adder 25 to produce an output video signal on line 26. Since the correction signal from line 23 is added 90° out of phase with the video signal on line 24, only small effects on differential gain and frequency response are introduced.

While the invention has been particularly shown and described with reference to a preferred embodiment thereof, it will be understood by those skilled in the art that various changes in form and details may be made therein without departing from the spirit and scope of the invention.

I claim:

1. A system for correcting differential phase distortion in a video signal incorporating chroma components, said system comprising:

clipping means for clipping said video signal above a predetermined amplitude to provide a clipped signal corresponding to the portion of said video signal above said predetermined amplitude;

first delay means responsive to said clipping means for imparting substantially a 180° phase delay to a signal at the subcarrier frequency;

comparison means responsive to said clipping means and said first delay means for providing a correction signal of instantaneous amplitude dependent upon instantaneous difference in phase between output signals produced by said clipping means and said first delay means;

second delay means for imparting to said video signal a phase delay of substantially 90° at said subcarrier frequency to provide a delayed subcarrier signal; and means responsive jointly to said comparison means and said second delay means for combining said correction signal and said delayed subcarrier signal to provide an output subcarrier signal having minimum differential phase distortion.

2. A system as defined in claim 1 including phase inverter means for selectively inverting said clipped signal, said phase inverter means coupling said clipped means to said first delay means.

3. A system as defined in claim 2 wherein said comparison means comprises a differential amplifier.

4. A system as defined in claim 3 wherein said combining means comprises means for adding said delayed subcarrier signal and said correction signal.

5. A system as defined in claim 4 wherein said clipping means includes means for varying the clipping level thereof.